United States Patent
Doll

[11] 3,929,282
[45] Dec. 30, 1975

[54] THERMOSTAT FOR CONTROLLING A LIQUID MIXER

[75] Inventor: Franz Doll, Montreux, Switzerland

[73] Assignee: Bernd Grohe, Villa Les Cretes, Switzerland

[22] Filed: Jan. 28, 1974

[21] Appl. No.: 436,895

[30] Foreign Application Priority Data
Feb. 1, 1973 Switzerland............... 1328/73
Apr. 18, 1973 Switzerland............... 5563/73

[52] U.S. Cl....... 236/12 R; 236/DIG. 11; 236/99 R; 73/368.2
[51] Int. Cl.²............................ G05D 23/00
[58] Field of Search.... 236/12 R, 93 A, 99 R, 99 D, 236/DIG. 11; 73/368.2; 137/114

[56] References Cited
UNITED STATES PATENTS

| | | | |
|---|---|---|---|
| 1,176,727 | 3/1916 | Clorius.................. | 236/DIG. 11 |
| 1,455,934 | 5/1923 | Powers et al............ | 236/12 R |
| 1,788,765 | 1/1931 | Hamblin et al.......... | 236/12 R |
| 1,797,258 | 3/1931 | Crosthwait et al....... | 236/DIG. 11 |
| 2,399,088 | 4/1946 | Andrews................ | 236/99 R |
| 2,651,467 | 9/1953 | Troy................... | 236/12 |
| 2,653,767 | 9/1953 | Gillham et al.......... | 236/99 R |
| 2,700,506 | 1/1955 | Berntson............... | 73/368.2 |
| 2,950,055 | 8/1960 | Algino et al........... | 236/12 R |
| 3,183,672 | 5/1965 | Morgan................. | 236/99 R |
| 3,441,212 | 4/1969 | Renne.................. | 236/12 R |

FOREIGN PATENTS OR APPLICATIONS

| | | | |
|---|---|---|---|
| 1,523,392 | 10/1969 | Germany................ | 236/99 R |
| 901,963 | 12/1953 | Germany................ | 236/DIG. 11 |
| 1,079,721 | 8/1967 | United Kingdom........ | 236/12 R |

Primary Examiner—John J. Camby
Assistant Examiner—Henry C. Yuen
Attorney, Agent, or Firm—Ostrolenk, Faber, Gerb & Soffen

[57] ABSTRACT

A thermostat for regulating temperature in a liquid, wherein the mixer comprises a chamber with separate hot and cold liquid entrances; a floating ball valve seated on the hot liquid entrance; a slit opening connection between the cold liquid entrance and the chamber, which slit is so directed as to cause the cold flow to assist in raising the ball off the hot flow inlet seat; a cylindrical, hydraulic fluid containing, flexible, elastic jacket surrounded chamber, wherein the fluid volume varies as to water temperature and a mechanical connection between the elastic jacket of the fluid containing chamber and the ball valve to force the ball toward the seat upon heating of the fluid in the temperature sensitive chamber.

13 Claims, 4 Drawing Figures

THERMOSTAT FOR CONTROLLING A LIQUID MIXER

The present invention relates to a thermostat that is used in a liquid mixer for controlling mixing of cold and hot liquids to obtain a selected liquid temperature.

Thermostats used in liquid mixers include flat diaphragm, multiple diaphragm and bimetallic element types. Known thermostats may, however, suffer injury and/or have their function impaired as a result of being directly contacted by the flowing liquid. In the case of household plumbing fittings, tap water regulated by the thermostat may be contaminated by acid, lime or other erosive or corrosive particles. Such contamination, combined with changes in liquid temperature and flow speed, and possibly as a result of chemical reactions, leads to injurious deposits, or corrosion caused by acid or cavitation. In addition, some known thermostats do not have the desired sensitivity and are not able to provide a high enough displacement force for their proper operation.

It is the object of the invention to provide a thermostat whose operation is not disturbed through prolonged use, which has a high degree of sensitivity and which is capable of providing sufficiently large displacement forces.

The invention involves a thermostat chamber to actuate a water temperature regulating part. The thermostat chamber is comprised of a generally bar shaped, hollow, enclosed cylinder that is filled with a heat-sensitive, hydropneumatically active substance and it is defined by and covered by a flexible, elastic, diaphragm-like jacket. A surrounding rigid protective covering means protects the thermostat chamber from the direct force of the flow of water.

In accordance with a further development of the invention, the thermostat is double walled, with an inner jacket and an outer jacket, both comprised of a highly elastic plastic material. There is a liquid in the space between the jackets. The double jacket causes the thermostat to be resistant to liquid diffusion, to have a sufficiently large control path and to produce a control pressure which is sufficient even for extreme cases of use in mixers.

One embodiment of the thermostat is now described in combination with a mixer. The invention will be better understood from the following description of the accompanying drawings in which.

Figure 2:
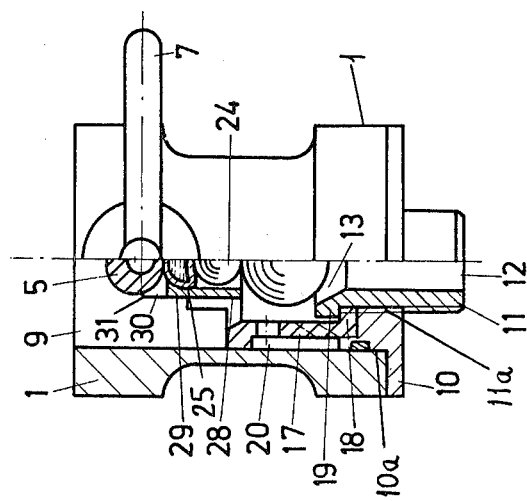
FIG. 2 is an elevation view in the direction of arrows 2 in FIG. 1, with the left half of the view in cross-section, taken along the line joining arrows 2.
Figure 1:
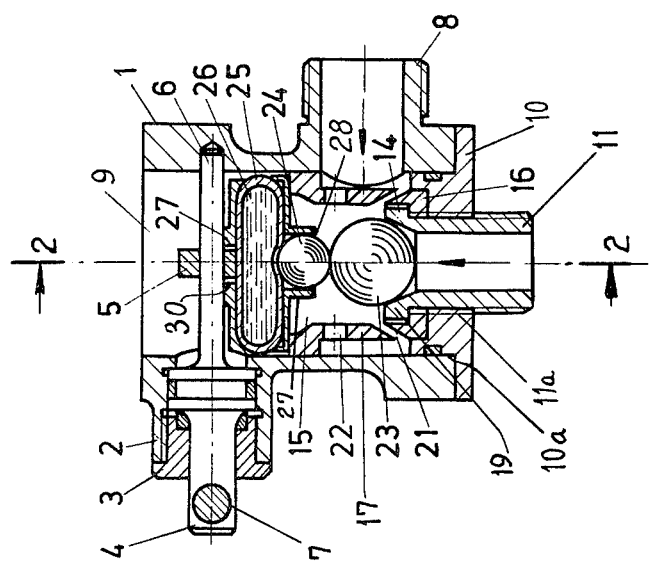
FIG. 1 is an elevation view in cross-section of a thermostat and liquid mixer in accordance with the invention.

The mixer in accordance with FIGS. 1 and 2 has a cylindrical housing 1. In housing upper opening 2 is positioned a plug 3, which has an opening through it that serves as the main bearing for a cam shaft 4 which carries eccentric disc 5. Shaft 4 is also carried by support 6 in the opposite housing wall. Cam shaft 4 can be rotated by lever 7.

Lower cross opening 8 serves as inlet for cool or cold water. Upper opening 9 serves as a connection for a water-removal valve. Lower opening 10a is closed by cover 10. Cover 10 has a threaded opening 11a centrally through it in which is screwed threaded insert 11. Bore 12 in insert 11 conducts warm or hot water into the mixer. Within the head 14 of the threaded insert 11 is a conical seat 13 which also serves as the hot-water entrance nozzle into pot-shaped mixing chamber 15. The bottom 16 of housing 17 of mixing chamber 15 is fixed in its position in recess 18 in cover 10 and housing 17 is connected by head 19 of threaded piece 11 firmly with the cover 10. The outer surface of cylindrical mixing chamber housing 17 cooperates with the inner wall of housing 1 to form annular chamber 20 which receives cold water through inlet 8. A first stream of cold water enters mixing chamber 15 from chamber 20 through obliquely directed, lower ejector slits 21. A second stream of cold water enters chamber 15 through transverse bores 22.

Within mixing chamber 15 is located a freely movable control ball 23. Above ball 23 is saddled displacement ball 24 for thermostat 25.

A stream of hot water enters the bottom of mixing chamber 15 through conical seat 13. The first cold water stream through oblique slots 21 passes in the vicinity of the hot water inlet. The second cold water stream passes through transverse bores 22 into the upper part of mixing chamber 15.

In household water mixers, a stream of cold water at 3 atmospheres pressure is generally admixed with a stream of hot water at 2 atmospheres pressure. In this arrangement, the volume of the cold water stream is generally about twice that of the hot water stream.

Under the foregoing conditions, the following operation of the above described mixer results. In the condition of rest, when no water is removed for use, higher cold water pressure presses control ball 23 into seat 13 to serve as a nonreturn valve for the hot water feed.

When water exits from outlet 9, the arrangement and shaping of inlets 21, 22 and 13 becomes significant. The transverse second stream of cold water through bores 22 continues to flow without influencing control ball 23. A strong ejector effect caused by the first stream of cold water through slits 21, however, affects the position of the control ball 23. The ball ceases to serve as a nonreturn valve and is brought into floating position. Hot water also now enters mixing chamber 15.

When the cold water pressure exceeds that of the hot water by more than 2.5 atmospheres, the ejector effect of the first stream of cold water through slits 21 can be increased by placing the plane of the oblique slits 21 lower and by appropriately profiling them. The increased ejector effect caused by the placement and profiling of slits 21 causes the control ball to float despite the great differences in inlet pressures of the different water temperature flows.

The mixture ratio of cold and hot water is determined by the floating height of control ball 23. Therefore, only the flow rate of one of the streams of water, the hot water stream being illustrated, is controlled. The streams of cold water are not regulated within the mixer.

The upward buoyancy of the floating control ball 23 is not unsubstantial. As a result, precise regulation of the float height of the ball and therefore of the mixture temperature is possible. The thermostat provided for this purpose must apply approximately the same forces at all temperatures. Its action is supported in certain operating ranges by the kinetic energy of the second stream of cold water through bores 22.

The bar shaped thermostat 25 is comprised of an elastic jacketed, hollow, enclosed cylinder, within which is provided hydropneumatic filling material 26. Thermostat 25 is supported in rigid, protective means tube 27. Mixing chamber housing 17 extends upwardly by two supporting arms 31 in which rest the ends of tube 27. Cover 10, threaded piece 11, mixing chamber 15, the balls 23 and 24 and the complete thermostat 25 and tube 27 together form a completely premountable insert unit.

Tube 27 has two open connections. The lower connection 28 receives displacement ball 24 and transmits the action of thermostat 25 to control ball 23. Upper connection 29 includes slot 30, which permits direct action of eccentric disc 5 on thermostat 25.

The material filling the thermostat forms it into a hydropneumatic system. This material is comprised predominantly of a pool of heat sensitive liquid above which is a small gas cushion, or it is comprised of a corresponding heat sensitive paste with inclusions of gas, or the like. The elastic jacket of the thermostat can be depressed without difficulty by a transverse force, particularly when this load is applied by a ball like ball 24.

Since thermostat 25 extends through rigid protective means 27, the diaphragm like jacket of the thermostat can be made film thin. This assures rapid transfer of heat. Furthermore, the resistance of the jacket to inward bulging due to outside pressure is slight, and the resulting reduction in the inside space of the thermostat can act fully on the pneumatically acting portion of the filling material within. The pneumatically acting portion of the filling material is of a volume such that when the maximum stroke of the control ball is reached, between the pressure of the water in chamber 15 plus the force of displacement of the control ball 23, on the one hand, and the increased pressure inside the diaphragm like jacket of the thermostat 25 caused by reduction of the inside volume, on the other hand, an equilibrium of forces which cannot be surpassed is produced. The foregoing applies to cold water. If the temperature of the water exiting outlet 9 increases, then the material filling the jacket of the thermostat also becomes heated. Because the hydraulically acting portion of the filling material is highly sensitive to heat, its volume is automatically increased. As a result of the newly established equilibrium of forces, the control ball 23 moves downwardly, reducing hot water flow through seat 13.

Preselection of a fixed output water temperature, to be obtained by a variable dosaging of the hot water to be mixed with the invariable stream of cold water, is effected by cam disc 5, or the like, acting directly on the elastic jacket of thermostat 25. In the minimum position of disc 5 shown in FIGS. 1 and 2, the periphery of the disc applies no force to the diaphragm of thermostat 25 and thus has no effect on the forces described above, and the output water is at maximum temperature. Upon rotative displacement of disc 5 by 180°, the periphery of the wider section of eccentric disc 5 reduces the volume inside the jacket of thermostat 25 and the volume for the pneumatically active part of the filling material in such a manner that control ball 23 is prevented from rising off seat 13 due to the equilibrium of forces. Ball 23 keeps the hot-water inlet 13 closed, and only cold water flows. Intermediate displacement positions of disc 5 vary the permissible maximum rise of ball 23.

The alternate embodiment of thermostat element arranged in rigid protective and carrying means or tube 27 in accordance with FIGS. 3 and 4 comprises a flexible, inner, diaphragm like jacket 60 and an outer jacket 61 pressure forced against the interior of tube 27, as described below. Inside jacket 60 is space 62 containing a hdyropneumatic filling material. In the space 63 between inner jacket 60 and outer jacket 61, there is a second filling material. On the left hand side in FIG. 3, the arrangement is closed off by a closure part 64. Through its lower side, tube 27 has a control opening 65 through which control ball 23 can be pushed. Instead of the control ball, any other desired displacing or force-transmitting element may be provided.

As filling media for the interior space 62, preferably low-boiling light hydrocarbons, for instance propane, n-butane or isobutane, are used. Such liquids are extermely heat sensitive and respond easily to changes in temperature and pressure which are transmitted by elastic, diaphragm like jacket 60. Depending upon the established operating conditions, the filling media have a gaseous state and a liquid state which exist in varying proportions.

The inner 60 and outer jacket 61 may be formed of highly elastic plastics, which are not attacked by the hydropneumatic filling material in inner space 62, for instance plastic having the trade names "Vulkollan" or "Adipren L100."

In order to avoid evaporation of the highly volatile hydrocarbons through the thin-wall diaphragm jackets 60, 61, a liquid filling of the Frigen group, for instance "Freon 113," is preferably provided in interjacket space 63. Glycerin or glycol can also be used. These substances have the chemical property of avoiding any mixing with light hydrocarbons and they also have no tendency to diffuse in either direction through the elastic jackets 60, 61. The already good thermal conductivity of Frigen, can be improved by addition of salts, so that the thermostat has an even higher sensitivity.

Figure 3:
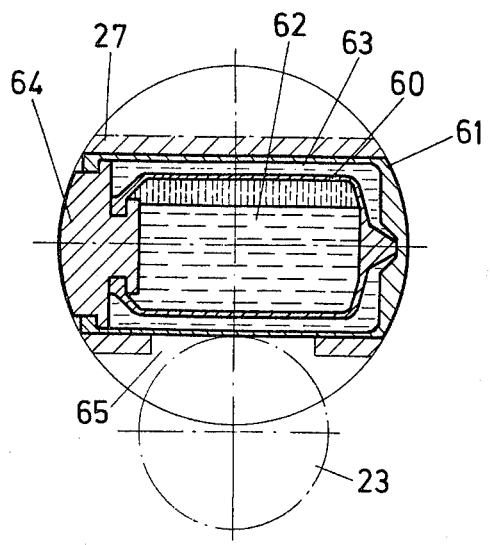
FIG. 3 is a cross-sectional elevation view through another embodiment of a thermostat, at maximum temperature and fully traveled control path.
Figure 4:
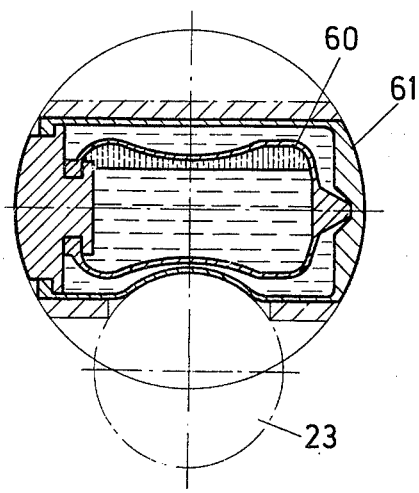
FIG. 4 shows the thermostat of FIG. 3 at minimum temperature.

In the condition of the thermostat at maximum temperature, shown in FIG. 3, control ball 23 is pressed fully downward. At minimum temperature, in FIG. 4, outer jacket 61 is pressed inwardly by an opposing force exerted by the control ball 23. Since the filling medium in space 63 exerts a purely hydraulic function with invariable volume, the hydropneumatic filling in the inner space 62 causes the diaphragm jacket 60 to assume the shape shown in FIG. 4.

Since the elastic outer jacket 61, with the exception of the control opening 65, is surrounded by tube 27 and the lateral reinforcement and the closure part 64, the hydropneumatic action is concentrated fully on the region of control opening 65. In this way, a particularly effective transmission of force is obtained.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A combination of a thermostat and a mixer for liquids of different temperatures, comprising:
   said mixer comprising:

a housing, a mixing chamber in said housing, a cold liquid inlet to said mixing chamber, a separate hot liquid inlet to said mixing chamber, a mixed liquid outlet from said mixing chamber;

a shiftable temperature regulating element in said mixing chamber, which said element is shiftable to various positions which block at least one said liquid inlet;

a seat at said hot liquid inlet; said temperature regulating element being shiftable toward and away from said seat, and said seat and said regulating element being cooperatively so shaped that when said regulating element is on said seat, flow through said one liquid inlet is blocked;

said temperature regulating element comprising a floatable ball, which floats in the presence of a liquid in said mixing chamber;

said cold liquid inlet communicates into said mixing chamber through inlet ports oriented to direct inflow at said ball and in a direction which raises said ball off said seat;

said thermostat comprising an enclosed thermostat chamber that is in communication with said mixing chamber and that is surrounded and defined by an elastic, flexible diaphragm-like jacket; said thermostat chamber being filled with a heat-sensitive, heat-expansive, hydropneumatically acting material; said jacket being in engagement with said temperature regulating element, thereby to shift the position of that said element as the temperature varies and as the volume of the material in said thermostat chamber varies.

2. The combination of claim 1, wherein said cold liquid inlet also communicates into said mixing chamber through second inlet ports, which are positioned so that inflow through said second inlet ports influences said ball after it has risen a distance from said seat.

3. A combination of a thermostat and a mixer for liquids of different temperatures, comprising:
said mixer comprising:
a housing, a mixing chamber in said housing, a cold liquid inlet to said mixing chamber, a separate hot liquid inlet to said mixing chamber, a mixed liquid outlet from said mixing chamber;

a shiftable temperature regulating element in said mixing chamber, which said element is shiftable to various positions which block at least one said liquid inlet;

a seat at said hot liquid inlet; said temperature regulating element being shiftable toward and away from said seat, and said seat and said regulating element being cooperatively so shaped that when said regulating element is on said seat, flow through said one liquid inlet is blocked;

said thermostat comprising an enclosed thermostat chamber that is in communication with said mixing chamber and that is surrounded and defined by an elastic, flexible diaphragm-like jacket; said thermostat chamber being filled with a heat-sensitive, heat-expansive, hydropneumatically acting material; said jacket being in engagement with said temperature regulating element, thereby to shift the position of that said element as the temperature varies and as the volume of the material in said thermostat chamber varies;

said jacket being surrounded by a rigid protective means having a first opening therethrough; said first opening being positioned such that said temperature regulating element can communicate therethrough with said jacket, and said rigid protective means having a second opening therethrough through which passes a thermostat chamber volume controlling element;

a thermostat chamber volume controlling element supported on said mixer and movable through said protective means second opening and movable against said thermostat chamber jacket to vary the volume of said thermostat chamber to a preselected extent, thereby to vary the extent which said jacket moves said temperature regulating element.

4. The combination of claim 3, wherein said material in said thermostat chamber comprises a heat-sensitive liquid and a gas cushion.

5. The combination of claim 3, wherein said material in said thermostat chamber comprises a heat-sensitive paste containing gas inclusions.

6. The combination of claim 3, further comprising a seat at said at least one liquid inlet;
said temperature regulating element being shiftable toward and away from said seat, and said seat and said regulating element being cooperatively so shaped that when said regulating element is on said seat, flow through said at least one liquid inlet is blocked.

7. The combination of claim 6, wherein said at least one liquid inlet is the said hot liquid inlet.

8. The combination of claim 3, wherein said thermostat chamber volume control element comprises an eccentric disc having a periphery engageable with said jacket and comprises a fixed axis supported on said mixer and about which said disc is rotated.

9. The combination of claim 3, wherein an intermediate element is interposed between said temperature regulating element and said jacket to transmit force therebetween.

10. The combination of claim 3, further comprising an outer jacket surrounding said thermostat chamber jacket and spaced therefrom and also being located within said protective means and pressure forced against said rigid protective means; both said jackets being comprised of highly elastic, flexible material; the space defined between said jackets being sealed and filled with a liquid.

11. The combination of claim 10, wherein said liquid in said space between said jackets is one of glycerin, glycol and Frigen.

12. The combination of claim 10, wherein said material in said thermostat chamber inner jacket is a low boiling point, light hydrocarbon.

13. The combination of claim 12, wherein said material in said thermostat chamber inner jacket is one of propane, n-butane and isobutane.

* * * * *